Feb. 18, 1969   W. R. SCOTT   3,427,718
DENTAL PROSTHETIC APPLIANCE CONNECTING APPARATUS
Filed Feb. 21, 1966
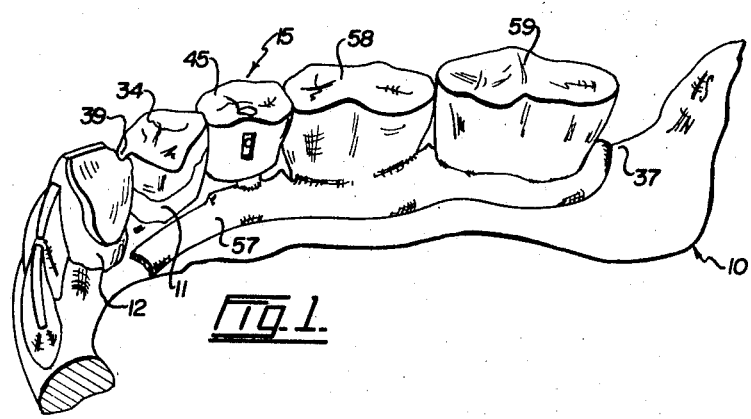
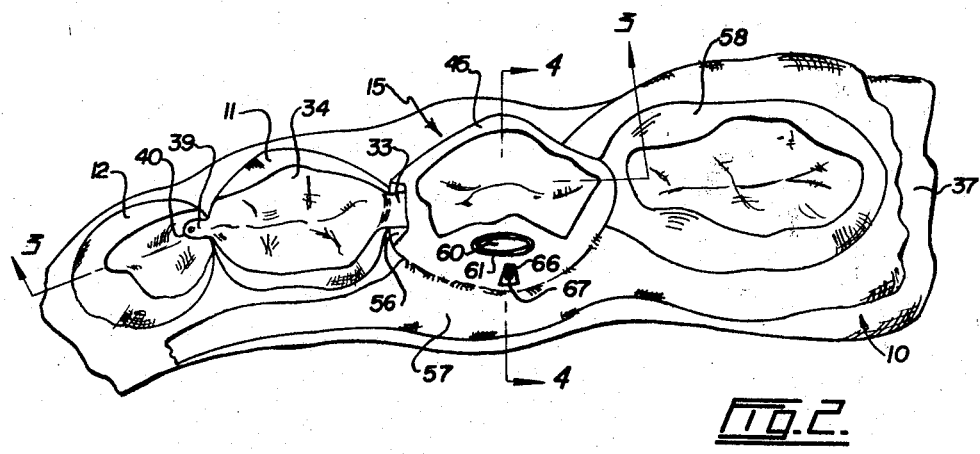
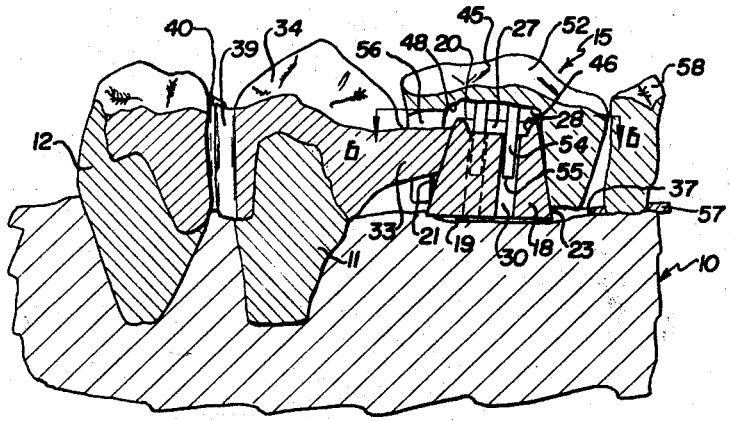
INVENTOR
WILLIAM R. SCOTT

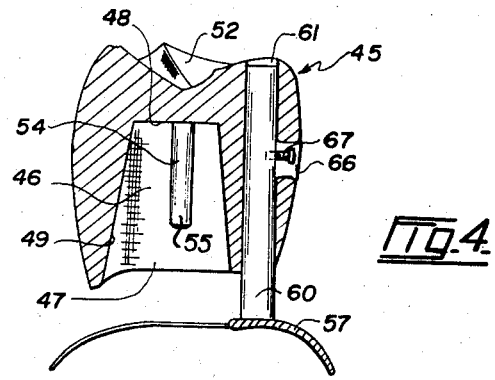
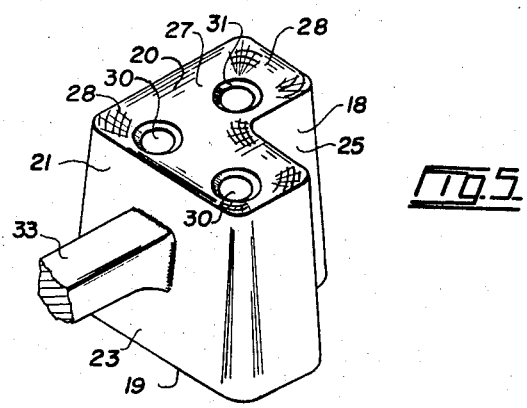
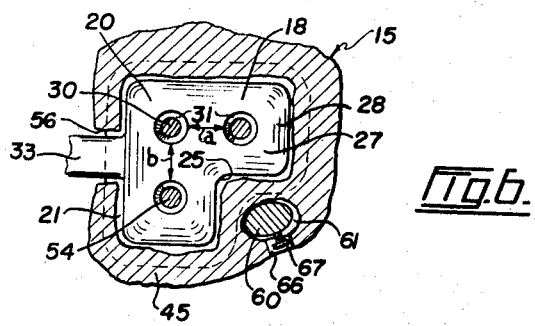

United States Patent Office 3,427,718
Patented Feb. 18, 1969

3,427,718
DENTAL PROSTHETIC APPLIANCE
CONNECTING APPARATUS
William R. Scott, 1114 Hillside Road, West Vancouver,
British Columbia, Canada
Filed Feb. 21, 1966, Ser. No. 529,017
U.S. Cl. 32—6                                                    18 Claims
Int. Cl. A61c 11/00, 13/22

ABSTRACT OF THE DISCLOSURE

This invention relates to a connecting apparatus for dental prosthetic appliances comprising the combination of a body having an inclined peripheral side wall, and a plurality of substantially parallel passages extending through the body from end to end thereof; and a cap having a socket therein and opening outwardly therefrom. The mating socket has an internal wall corresponding in shape to the body side wall and inclined at an angle of incline less than that of the body side wall so as to tightly grip the latter when the cap is placed on the body. A plurality of substantially parallel pins are secured in the socket, one for and positioned to fit in each of the passages.

---

This invention relates to connecting apparatus for dental prostetic appliances.

An object of the present invention is the provision of a connector or attaching device for dental prosthetic appliances, such as fixed-removable or partial dentures, and which can be used along or in conjunction with one or more other attachments, such as a hook, or can be used as free end saddles joined by palatal bars or lingual bars.

The present connecting apparatus is such that one can be used for many different purposes, thereby eliminating the necessity of having a stock of many different sizes and shapes as is the case with the connectors now in common use. The basic unit of the present connector is made a little longer than normally required so that it is only necessary to grind it to the desired length for any given situation, and this can be done without affecting the efficacy of the device. Part of the connecting apparatus can be fabricated by a dental laboratory technician to suit the job being done.

The basic unit of this connector being made relatively long is advantageous in "short bite" cases as well as for extra long tooth crowns due to loss of bone and periodontal structures.

The present connecting apparatus retains the attachment separate or standing free of the abutment or supporting tooth so as not to interfere with the periodontium of this tooth. With most prior connectors, and particularly those called "internal attachment," the connector is incorporated in the crown or cap of the abutment tooth. This required a space or recess in the side of the abutment tooth where the connector is to be placed. If such a space or recess is not already available, one must be cut, or the attachment of connector would have to be accommodated outside the usual anatomical limits of the tooth with the attendant physiological problems to the periodontium.

The basic connecting apparatus according to the present invention comprises a connecting body adapted to be supported by and beside an abutment tooth that is supported by bone and sound periodontium. This body has a base end to be positioned on the mucosa of the alveolar ridge, an opposite outer end facing away from the base end, a side wall extending between the ends and inclined outwardly from the outer end in the direction of the base end, and a plurality of substantially parallel passages extending through the body from the outer end to the base end thereof, said passages being positioned to receive corresponding pins of a cap fitting over the connecting body. The body and pins can be made by the manufacturer a little longer than necessary so that they can be ground down to desired lengths. These elements are supplied to the dentist, and he uses them in the many different situations with which he is confronted and which require connecting devices for prosthetic appliances.

The connecting apparatus includes a cap having an internal socket with an entrance end opening outwardly therefrom and shaped to fit over said connecting body and to engage the side wall thereof. The cap can be supplied with other elements of the connecting apparatus, in which case, different prosthetic appliances can be secured thereto, and/or a crown may be fitted on to or formed on the cap. On the other hand, the cap itself may be formed as a crown and/or the appliances connected thereto. In the latter case, the cap will be made for a particular situation. The socket of the cap has a bottom facing the entrance thereof, and the pins mentioned above, one for each passage of the connecting body, are secured to said bottom and project towards the socket entrance. These pins are substantially parallel and are arranged slidably to fit in the connecting body passages.

In the preferred form of the invention, the pins terminate within the socket near and clear of the entrance thereof. With this arrangement, the entrance portion of the socket acts as a guide when the cap is being applied to the connecting body in order to help direct the pins into the body passages. As the side wall of the connecting body is inclined outwardly towards the base end thereof, the cap grips the body when said cap is moved towards the base end. This grip helps to keep the cap in place on the connecting body. The taper or incline of the wall of the body causes this gripping action. For example, with gold metals this taper ranges from about 1:20 to about 1:50. In addition to this, one or more of the pins can be slightly bent out of line so as frictionally to engage the wall of the passage in which the pin fits as the cap is moved over the body. The grip between the connecting body and cap remains constant even after some wear has taken place since the cap merely fits further down over the body.

When it is desired to use this connecting apparatus to retain one or more additional artificial teeth in position, the cap is provided with a passage extending therethrough clear of the socket and usually roughly parallel to the pins in said socket. A saddle carrying one or more additional artificial teeth and shaped to rest on the alveolar ridge is, provided, and a bracing or connecting pin mounted at one end on the saddle slidably fits into the cap passage.

An example of the present invention is illustrated in the accompanying drawings, in which, FIGURE 1 is a portion of a mandible with prosthetic appliance connecting apparatus according to this invention in use, FIGURE 2 is an enlarged plan view of the portion of the mandible, showing the connecting apparatus in plan, FIGURE 3 is a vertical section taken substantially on the line 3—3 of FIGURE 2, FIGURE 4 is a cross section through the connecting apparatus taken on the line 4—4 of FIGURE 2, with the connecting body omitted, FIGURE 5 is a perspective view of the connecting body by itself, and FIGURE 6 is a horizontal section taken on the line 6—6 of FIGURE 3, showing the connecting body in plan.

Referring the drawings, 10 represents a portion of a mandible having sound teeth 11 and 12 projecting therefrom. The tooth immediately next to tooth 11 has been extracted, and connecting apparatus generally indicated by the reference numeral 15 has been used to fill the gap, said apparatus being shaped to resemble the tooth that has been extracted.

Connecting apparatus 15 includes a connecting body 18 which has a base end 19, an outer end 20 and a side wall 21. This body can be made out of any suitable material, such as chrome, ceramic type metals, hard gold, and the like. Side wall 21, which is the entire wall of the body, is inclined outwardly from outer end 20 in the direction of base end 19, as clearly shown at 23 in FIGURE 3, and said side wall preferably is flat from end to end of the body. Although connecting body 18 may have any desired cross sectional shape, it is preferably substantially L-shaped in cross section, as clearly shown in FIGURES 5 and 6, said shape providing an indentation 25 extending from end to end of the body. It is preferable, although not absolutely necessary, to form the outer end 20 of the body with a depression 27 having a surrounding lead-in convex wall 28, see FIGURES 3, 5 and 6. A plurality of substantially parallel passages 30 extend through body 18 from outer end 20 to base end 19 thereof, each passage having an enlarged entrance 31 opening into depression 27. These passages are preferably arranged in a substantially triangular pattern, as seen in FIGURES 5 and 6. In the preferred form of the invention, passages 30 are located at the corners of a right angle triangle, and the spaces between said passages at upper end 20 of the body indicated by lines $a$ and $b$ in FIGURE 6, are each substantially equal to the diameter of one of the passages. Furthermore, the outer surface of wall 21 is preferably spaced from the adjacent passage by about one diameter of the latter.

Connecting body 18 is adapted to be supported by and beside abutment tooth 11 in this example. A supporting member or arm 33 is fixedly secured to the side of connecting body 18 in any desired manner, such as by soldering, and the opposite end of this member or arm is fixedly secured to tooth 11. In this example, a crown 34 is fitted on to the tooth, and member 33 forms part of the crown and projects laterally therefrom. Before being put into place, the base end of body 18 is ground so that it is positioned above or fits over the surface of alveolar ridge 37 of mandible 10.

If connecting apparatus 15 will be subjected to hard wear or pressure, it is desirable to connect body 18 to tooth 12 to help offset the cantilever effect resulting from the fact that body 18 is connected to the outer end of member or arm 33. In this case, a connecting pin 39 is connected to the end of member 33 opposite the end to which body 18 is connected, said pin being parallel to the path of insertion of crown 34 on to tooth 11. This pin is adapted to slidably fit into a tube or passage 40 in tooth 12. Pin 39 is slipped into tube 40 when crown 35 is applied to tooth 11. If desired, pin 39 may be on tooth 12 and tube or passage 40 in the end of member 33.

Connecting body 18 is now secured in position, and any desired dental prosthetic appliance can be connected to said body. When in use, connecting apparatus 15 includes a cap 45 having a socket 46 therein, said socket opening out from the cap and having an entrance 47 opposite a bottom 48 of said socket. Cap 45 and socket 46 are formed so that the cap can be placed over connecting body 18, and the internal wall 49 of the cap which forms socket 46 engages the side wall 21 of body 18 before the lower edge of the cap reaches base end 19 of the body and before socket bottom 48 engages outer end 20, as clearly shown in FIGURE 3. Wall 49 of this cap is shaped to correspond to the shape of side wall 21 of the connecting body. As clearly shown in FIGURE 3, wall 49 is inclined outwardly from bottom 48 towards entrance 47 at an angle less than the angle of incline of side wall 21 of body 18 so as to tightly grip said side wall before outer end 20 of the body engages socket bottom 48. These caps may be supplied with the other elements of this apparatus, in which case, a crown would be fitted over or formed on the cap. On the other hand, the cap may be made for a given job, in which case, it can be shaped in the form of a crown, as indicated at 52 in FIGURES 3 and 4. The connector and its crown form a prosthetic appliance in the form of an artificial tooth.

A plurality of substantially parallel pins 54, one for each passage 30, are secured to socket bottom 48 and extend in socket 46 towards entrance 47. The free ends 55 of these pins preferably terminate within socket 46 near but inwardly of entrance 47, see FIGURE 4. These pins 54 are arranged in the same substantially triangular pattern as socket 30. A relatively large slot 56 is formed in a side wall of cap 45 in order to allow the cap to fit over supporting member 33 when the cap is pressed on to connecting body 18. It will be seen from FIGURE 3 that member 33 is at a lower level than outer end 20 of the connecting body.

In this example, connecting apparatus 15 secures crown 52 to teeth 11 and 12. Tooth 11 provides the main support for the crown, whereas tooth 12 assists this and helps to offset to some extent the cantilever action in the connecting apparatus. Cap 45 is pressed on to connecting body 18, and the taper or incline of wall 21 causes the cap firmly to be gripped when pressed into this position. Pins 54 slidably fit in passages 30 of the connecting body. If desired, one or more of these pins can be bent slightly out of its normal position so that it frictionally engages the wall of its passage as the cap is applied to the body. The cap and its crown 52 are firmly held in position on the connecting body, and yet they can be removed without difficulty. As entrance 47 of the cap is of such size and shape as to engage wall 21 of body 18 near the base end 19 thereof, said entrance is larger than the outer end 20 of the body. Thus, the entrance helps to guide the cap on to the connecting body when said cap is being applied thereto. The fact that pins 54 terminate inwardly of the entrance facilitates this action. The indentation 27 of outer end 20 of the connecting body and the passage entrances 31 help to guide pins 54 into body passages 30. It is desirable to have the cap engage the body before the pins do, thereby preventing the pins from becoming bent. Thus, the cap and crown after removal can be quickly and easily returned to their position on connecting body 18. As passages 30 extend through the connecting body, it is easy to prevent food from accumulating in these passages. Pins 54 provide a vertical frictional grip, whereas cap 45 fitting over the connecting body provides lateral or downward retention or grip. As the cap fits completely around body 18, there is no distal movement and strain on the pins.

Connecting apparatus 15 may be used to retain an additional prosthetic appliance in position in the wearer's mouth and relative to sound teeth 11 and 12 and the artificial tooth provided by the connecting apparatus and its crown. In this example this prosthetic appliance comprises a saddle 57 having thereon artificial teeth 58 and 59, said saddle being adapted to fit over alveolar ridge 37, see FIGURES 1, 2 and 4. A bracing or connecting pin 60 is secured to saddle 57 and freely extends through a passage 61 formed in and extending through cap 45 clear of socket 46, see FIGURES 4 and 6. This passage is located in the portion of the cap that fits in indentation 25 of body 18. Pin 60 fitting in passage 61 retains saddle 57 and teeth 58 and 59 in proper position relative to sound teeth 11 and 12 while permitting vertically movement of said saddle. As the saddle rests upon the relatively soft alveolar ridge, there is a tendency for the saddle to move slightly up and down. The sliding action of pin 60 permits this without transferring any strain to cap 45 and connecting body 18. The passage 61 and pin 60 extend in the direction of the functional forces applied to teeth 58 and 59 during mastication, teeth clenching and the like.

If desired, pin 60 may be movably connected to cap 45. For this purpose, a short slot 66 is formed in cap 45 extending parallel to passage 61 and opening laterally into said passage and outwardly from the cap, as clearly shown in FIGURES 4 and 6. A screw 67 is threaded into pin 60 and extends laterally into slot 66. Screw 67 permits limited relative movement between pin 60 or saddle 57 and cap 45, but prevents the saddle from moving upwardly away from the alveolar ridge 37. If it is desired to separate cap 45 and saddle 57, screw 67 is first removed from pin 60.

The length of slot 66 determines the amount of vertical movement of the saddle 57. The head of screw 67 limits the amount of vertical movement, acting as a stop at either end of the slot. Pressure on saddle 57 covering the mucosa over the alveolar ridge will under certain conditions cause the mucosa to change shape. The saddle will move vertically and/or horizontally.

It is necessary therefore to allow for the movement of the saddle both vertically and horizontally without causing a cantilever force beyond the physiological limits of the periodontium of the abutment tooth which would in time be a damaging force with subsequent loss of the supporting periodontal structures. When first inserted the limiting screw is placed at the top of the slot. As the alveolar ridge shrinks or changes, the screw drops to the bottom of the slot indicating it is time to "reline" the saddle area.

In the illustrated example, connecting apparatus 10 provides a crown or tooth in the gap next to abutment tooth 11. This abutment tooth provides the main support for the device, while tooth 12 assists through tube 40 and pin 39. As pin 39 is movable in tooth 12, there can be slight relative movement between teeth 11 and 12 without affecting the connecting apparatus. It is obvious that any desired prosthetic appliance can be connected or secured to cap 45. The appliance can be completely or partially supported or positioned by connecting body 18, and yet the appliance can be quickly and easily removed from the wearer's mouth and returned thereto. Wear in body 18 and cap 45 does not affect the proper operation of the connecting apparatus because of the taper or incline of the wall of the connecting body. The triangular arrangement of pins 54 and their corresponding passages in body 18 help to prevent lateral, vertical and longitudinal movement of the prosthetic appliance in the wearer's mouth. If it is found that there is not sufficient friction at any given time to hold cap 45 in place on the connecting body, it is only necessary to bend one or more of the pins 54 slightly out of alignment with its passage 30 so as to increase friction therebetween when the cap is applied to the connecting body. As cap 45 is external to body 18, said cap can be made any desired shape or size in accordance with the dental requirements. This is an improvement over the prior connecting devices which are internal fittings.

An important advantage of the present connecting apparatus lies in the fact that a dentist can keep a supply of connecting bodies 18, friction pins 54 and bracing pins 60 on hand for use in many different situations. Caps 45 are easily made for desired purposes, although basic caps also may be kept on hand. This eliminates the necessity of having many connectors of different sizes and shapes on hand, as has been necessary in the past.

What I claim as my invention is:

1. Connecting apparatus for dental prosthetic appliances, comprising in combination a connecting body adapted to be supported by and beside an abutment tooth anchored in bone and periodontium; said body having a base end to be positioned over the alveolar ridge, an opposite outer end facing away from the base end, a peripheral side wall extending between said ends and inclined outwardly from the outer end in the direction of the base end, and a plurality of substantially parallel passages extending through the body from the outer end to the base end thereof; and a cap having an internal socket with an entrance opening outwardly therefrom and shaped to surround and to fit over said body and to engage the side wall thereof, said socket having a bottom facing the entrance thereof, said socket having an internal wall corresponding in shape to the body side wall and inclined outwardly from said socket bottom towards said entrance at an angle less than the angle of incline of the body side wall so as to tightly grip said side wall when the cap is placed on the body before the outer end of the body engages the socket bottom, and a plurality of substantially parallel pins in the socket, one for and positioned to fit in each of said passages, and secured to said bottom and projecting towards said entrance slidably to fit in their respective passages, said pins terminating within the socket near and clear of the entrance thereof.

2. Connecting apparatus as claimed in claim 1 in which said side wall is flat from end to end of the body and said socket wall is flat from end to end of the socket.

3. Connecting apparatus as claimed in claim 1 in which said outer end of the connecting body is formed with a large depression to provide guide means to help direct the pins of said cap into the body passages when said cap is being placed on the connecting body.

4. Connecting apparatus as claimed in claim 3 in which each passage has an enlarged entrance opening into said depression.

5. Connecting apparatus as claimed in claim 1 in which the supporting body is substantially L-shaped in a plane extending normal to the passages thereof, and the cap socket is correspondingly shaped in cross section.

6. Connecting apparatus as claimed in claim 1 in which there are three passages in the connecting body located substantially at the corners of a right angle triangle, and the cap pins are correspondingly arranged.

7. Connecting apparatus as claimed in claim 1 in which the cap has a passage extending therethrough clear of said socket, and including a prosthetic appliance comprising a saddle adapted to rest on the alveolar ridge, and a connecting pin mounted at one end on the saddle and slidably fitting in said cap passage, said passage and pin extending in the direction substantially normal to said saddle.

8. Connecting apparatus as claimed in claim 7 including a short slot in the cap extending parallel to the cap passage and opening laterally into the latter passage and outwardly from the cap, and a screw threaded into said bracing pin and extending laterally into said slot.

9. Connecting apparatus as claimed in claim 5 in which the cap has a passage extending therethrough in the portion thereof fitting within the L of the supporting body, and including a prosthetic appliance comprising a saddle adapted to rest on the alveolar ridge, and a connecting pin mounted at one end on the saddle and slidably fitting in said cap passage, said passage and pin extending in the direction substantially normal to said saddle.

10. Connecting apparatus as claimed in claim 9 including a short slot in the cap extending parallel to the cap passage and opening laterally into the latter passage and outwardly from the cap, and a screw threaded into said bracing pin and extending laterally into said slot.

11. Connecting apparatus as claimed in claim 1 including a supporting member fixedly secured at one end to the connecting body spaced from the base end thereof and adapted to be secured to said abutment tooth beside the body, a connecting pin fixed to an opposite end of said member, and a tube to be secured to another tooth beside the abutment tooth for receiving the connecting pin when the supporting member is secured to said abutment tooth.

12. Connecting apparatus as claimed in claim 1 in which said outer end of the connecting body is formed with a large depression to provide guide means to help direct the pins of said cap into the body passages when said cap is being placed on the connecting body, the supporting body is substantially L-shaped in a plane extending normal to the passages thereof and the cap socket is correspondingly shaped, there are three passages in the connecting body arranged in a substantially triangular pattern and the cap pins are correspondingly arranged, the cap has a passage extending therethrough clear of said socket and substantially parallel to said pins, and including a saddle adapted to rest on the alveolar ridge, a connecting pin mounted at one end of the saddle and slidably fitting in said cap passage, said passage and pin extending in the direction substantially normal to said saddle, a short slot in the cap extending parallel to the cap passage and opening laterally into the latter passage and outwardly from the cap, and a screw threaded into said bracing pin and extending laterally into said slot.

13. Connecting apparatus for dental prosthetic appliances, comprising in combination a connecting body adapted to be supported by and beside an abutment tooth anchored in bone and periodontium; said body having a base end to be positioned over the alveolar ridge, an opposite outer end facing away from the base end, a peripheral side wall extending between said ends and inclined outwardly from the outer end in the direction of the base end, and a plurality of substantially parallel passages extending through the body from the outer end to the base end thereof; and a cap having an internal socket with an entrance opening outwardly therefrom and shaped to surround and to fit over said body and to engage the side wall thereof, said socket having a bottom facing the entrance thereof, said socket having an internal wall corresponding in shape to the body side wall and inclined outwardly from said socket bottom towards said entrance, said socket bottom being smaller than the body outer end so that said internal wall tightly grips said side wall when the cap is placed on the body, said outer end of said body being spaced from said bottom of said socket when said internal wall tightly grips said peripheral side wall, and a plurality of substantially parallel pins in the socket, one for and positioned to fit in each of said passages, and secured to said bottom and projecting towards said entrance slidably to fit in their respective passages, said pins terminating within the socket near and clear of the entrance thereof.

14. Connecting apparatus as claimed in claim 13 in which said outer end of the connecting body is formed with a large depression to provide guide means to help direct the pins of said cap into the body passages when said cap is being placed on the connecting body.

15. Connecting apparatus as claimed in claim 13 in which there are three passages in the connecting body located substantially at the corners of a right angle triangle, and the cap pins are correspondingly arranged.

16. Connecting apparatus as claimed in claim 13 in which the cap has a passage extending therethrough clear of said socket, and including a prosthetic appliance comprising a saddle adapted to rest on the alveolar ridge, and a connecting pin mounted at one end on the saddle and slidably fitting in said cap passage, said passage and pin extending in the direction substantially normal to said saddle.

17. Connecting apparatus as claimed in claim 16 including a short slot in the cap extending parallel to the cap passage and opening laterally into the latter passage and outwardly from the cap, and a screw threaded into said bracing pin and extending laterally into said slot.

18. Connecting apparatus as claimed in claim 13 including a supporting member fixedly secured at one end to the connecting body spaced from the base end thereof and adapted to be secured to said abutment tooth beside the body, a connecting pin fixed to an opposite end of said member, and a tube to be secured to another tooth beside the abutment tooth for receiving the connecting pin when the supporting member is secured to said abutment tooth.

References Cited

UNITED STATES PATENTS

| 1,060,568 | 4/1913 | Hurd | 32—6 X |
| 1,299,067 | 4/1919 | Underwood | 32—5 |
| 2,669,779 | 2/1954 | Zuccoli | 32—5 |

FOREIGN PATENTS

| 336,898 | 5/1921 | Germany. |
| 842,832 | 5/1952 | Germany. |
| 588,177 | 1959 | Italy. |
| 606,011 | 1960 | Italy. |

LOUIS G. MANCENE, *Primary Examiner.*

S. NATTER, *Assistant Examiner.*